US011811558B2

(12) United States Patent
Singh et al.

(10) Patent No.: US 11,811,558 B2
(45) Date of Patent: Nov. 7, 2023

(54) CROSS-SUBSCRIPTION MULTI-VNET HOMING

(71) Applicant: Microsoft Technology Licensing, LLC, Redmond, WA (US)

(72) Inventors: Raman Deep Singh, Bothell, WA (US); Ashish Bhargava, Sammamish, WA (US); Sumit Gupta, Redmond, WA (US); Vinaya Natarajan, Cupertino, CA (US); Anavi Arun Nahar, Seattle, WA (US); Vikrant Arora, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 16/991,646

(22) Filed: Aug. 12, 2020

(65) Prior Publication Data
US 2022/0052877 A1 Feb. 17, 2022

(51) Int. Cl.
*H04L 12/46* (2006.01)
*G06F 9/455* (2018.01)
*H04L 41/0893* (2022.01)

(52) U.S. Cl.
CPC ...... *H04L 12/4641* (2013.01); *G06F 9/45558* (2013.01); *H04L 41/0893* (2013.01);
(Continued)

(58) Field of Classification Search
CPC ............. H04L 12/4641; H04L 41/0893; G06F 9/45558; G06F 2009/4557; G06F 2009/45595
See application file for complete search history.

(56) References Cited

U.S. PATENT DOCUMENTS 10,075,459 B1 * 9/2018 Suryanarayanan ........................ H04L 63/1441
10,645,020 B1 * 5/2020 Subramanyam ...... H04L 41/122
(Continued)

FOREIGN PATENT DOCUMENTS

EP 3617880 A1 3/2020

OTHER PUBLICATIONS

"International Search Report and Written Opinion issued in PCT Application No. PCT/US21/030386", dated Aug. 25, 2021, 9 Pages.
(Continued)

*Primary Examiner* — Kodzovi Acolatse
*Assistant Examiner* — Anindita Sen
(74) *Attorney, Agent, or Firm* — Mark K. Young; Mark Young PC

(57) ABSTRACT

A network interface controller (NIC) associated with a virtual machine (VM) in a cloud computing network is configured to be flexibly attached and detached from a parent NIC to thereby enable the virtual machine to simultaneously be attached to multiple different virtual networks (VNets) and/or subnets that are associated with the same or different subscriptions. The inventive NIC, referred to herein as a flexibly extensible NIC (eNIC), enables a service provider to inject compute instances into an existing VNet using a multi-homing configuration in which the data plane uses a dedicated network interface to connect the customer's VNet, while another dedicated network interface provides management plane connectivity to the service provider. Such multi-VNet homing advantageously provides data plane isolation for the customer's VNet to comply with applicable security policies without disrupting management traffic between the injected resources and the service provider.

20 Claims, 15 Drawing Sheets

(52) U.S. Cl.
CPC ............... *G06F 2009/4557* (2013.01); *G06F 2009/45595* (2013.01)

(56) References Cited

U.S. PATENT DOCUMENTS

| | | | |
|---|---|---|---|
| 10,938,641 B1* | 3/2021 | Fritz | H04L 41/0856 |
| 11,050,787 B1* | 6/2021 | Sharifi Mehr | G06F 9/45558 |
| 11,190,406 B1* | 11/2021 | Tewari | H04L 45/66 |
| 2008/0147828 A1* | 6/2008 | Enstone | H04L 41/0846 709/220 |
| 2010/0131636 A1* | 5/2010 | Suri | H04L 45/125 709/224 |
| 2011/0002346 A1* | 1/2011 | Wu | H04L 67/561 370/474 |
| 2011/0004877 A1* | 1/2011 | Wu | H04L 41/0816 718/1 |
| 2020/0073692 A1* | 3/2020 | Rao | H04L 41/0893 |
| 2020/0097310 A1 | 3/2020 | Shukla et al. | |
| 2020/0159555 A1* | 5/2020 | Liguori | G06F 9/45558 |
| 2020/0162332 A1* | 5/2020 | Liguori | G06F 9/45558 |
| 2020/0264897 A1* | 8/2020 | Popo | G06F 9/45558 |

OTHER PUBLICATIONS

"Creating Instances with Multiple Network Interfaces", Retrieved from: https://web.archive.org/web/20190526191901/https://cloud.google.com/vpc/docs/create-use-multiple-interfaces, May 26, 2019, 13 Pages.

"Elastic Network Interfaces", Retrieved from: https://web.archive.org/web/20200626044726/https://docs.aws.amazon.com/AWSEC2/latest/UserGuide/using-eni.html, Jun. 26, 2020, 25 Pages.

Wasserman, et al., "Current Practices for Multiple-Interface Hosts", Retrieved from: https://tools.ietf.org/html/rfc6419, Nov. 2011, pp. 1-21.

* cited by examiner

900

CROSS-SUBSCRIPTION MULTI-VNET HOMING

BACKGROUND

A cloud computing environment, also called a "cloud computing network," "distributed computing system," or simply a "cloud," typically provides compute, networking, and storage resources and services on demand from virtual machines over a wide-area network, such as the Internet. The resources provided by the cloud computing services are generally available on demand from shared pools of configurable computing resources such as networks, servers, storage devices, applications, and software services.

Some cloud computing services employ compute instances that are injected into a customer's virtual network using a dedicated data-plane to isolate data from that of other customers. However, security policies implemented on a customer's virtual network can break management plane connectivity to the injected compute instances, which disrupts the resource deployment.

SUMMARY

A network interface controller (NIC) associated with a virtual machine (VM) in a cloud computing network is configured to be elastically attached and detached from a parent NIC to thereby enable the virtual machine to simultaneously be connected to multiple different virtual networks (VNets) and/or subnets that are associated with the same or different subscriptions. The inventive NIC, referred to herein as a flexibly extensible NIC (eNIC), enables a service provider to inject compute instances into an existing VNet using a multi-homing configuration in which the data plane uses a dedicated network interface to connect the customer's VNet, while another dedicated network interface provides management plane connectivity to the service provider. Such multi-VNet homing advantageously provides data plane isolation for the customer's VNet to comply with applicable security policies without disrupting management traffic between the injected resources and the service provider. Using a cross-subscription architecture, the parent NIC may be associated with a service subscription for management traffic to the injected compute instances, for example, and an attached eNIC associated with a customer subscription for data traffic.

In addition to the isolation provided between data and management traffic to the injected compute instances, utilization of the eNIC provides additional flexibility for cloud computing customers and service providers. For example, compute instances can be simultaneously connected to different subnets (which may have different security policies) in a customer's VNet. Such multi-homing capabilities provided by the eNIC may advantageously promote efficient organization and consumption of resources in the customer's enterprise.

Utilization of the eNIC can support implementation of a multi-tenant architecture to provide access by multiple tenants to a single shared VM. Each eNIC attached to a parent NIC associated with a service provider may use a unique network partition identifier (NPI) for each tenant subscription. The eNIC provides flexible implementation of multi-tenancy while enabling granular networking policies to be enforced to a particular discrete computing workload, rather than across the entire VM. A virtual filtering platform extension underlying the parent NIC is configured to enforce specific networking policies that are tied to each eNIC including, for example, bandwidth metering, access control, VNet data encapsulation and addressing, etc. The data planes for each tenant on the VM are operated concurrently yet are isolated from each other to ensure that data processing for one tenant has no impact on others.

The eNIC can also provide pre-provisioning of additional computing resources with associated policies that can be rapidly deployed on demand while reducing the time that is conventionally needed to inject resources into a customer's VNet. In such "hot attach" architecture, a service provider can have a pool of already active compute instances on standby in a VM. The service can attach an eNIC to a parent NIC and associate it with the customer's subscription to provide access to the customers VNet. Management and data planes operate independently to prevent disruption while providing conformance with applicable networking and security policies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
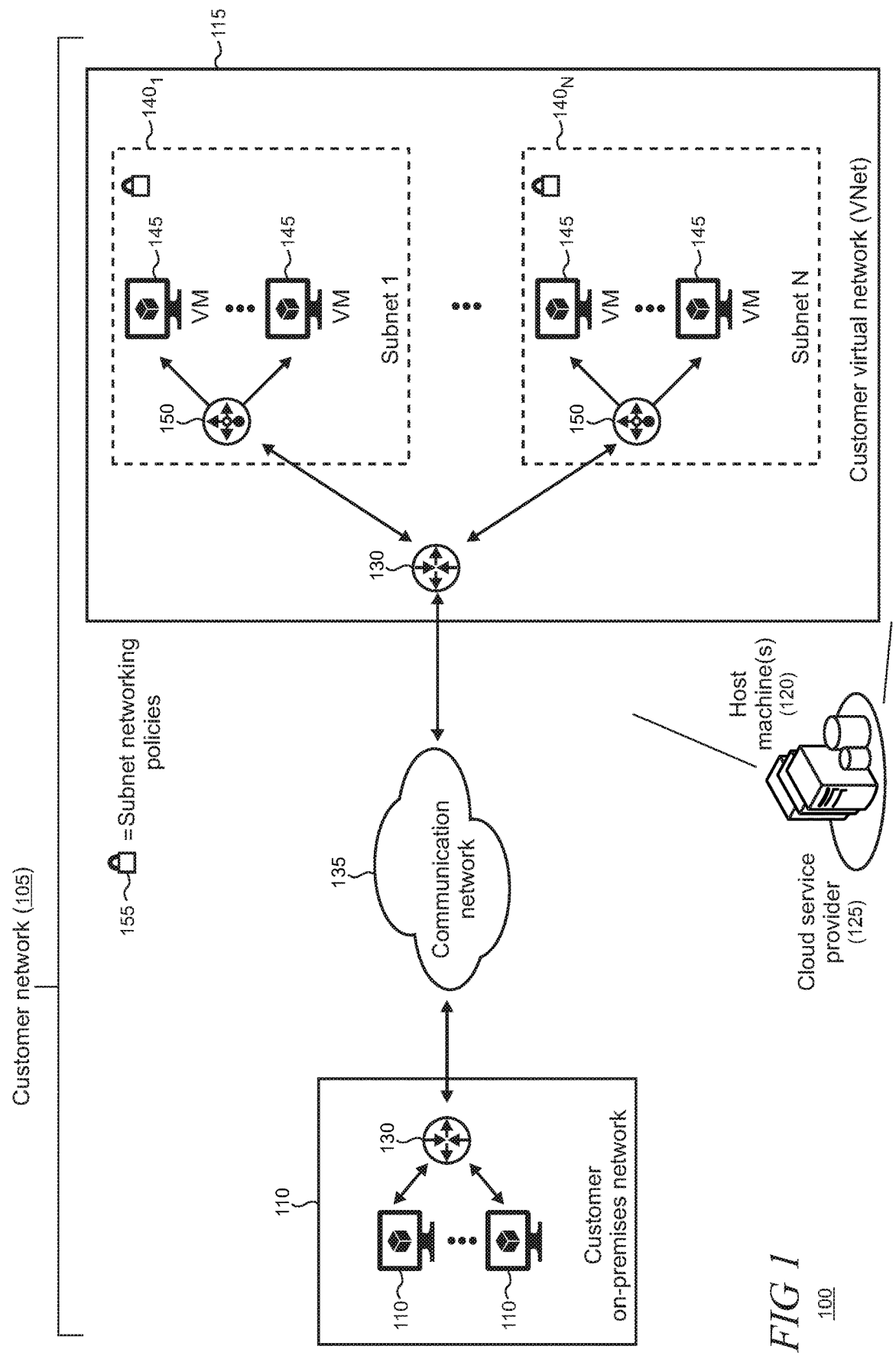
FIG. 1 shows an illustrative hybrid cloud computing environment.

FIG. 1 shows an illustrative cloud computing environment 100 in which a customer network 105 includes multiple portions including an on-premises network 110 and a virtual network (VNet) 115. The customer network in this example is a "hybrid" network but other network configurations may also be utilized depending on the particular requirements of a cross-subscription multi-VNet homing scenario. The VNet may be physically implemented using one or more host machines 120 that are operated by a cloud service provider 125. It is noted that the diagram in FIG. 1 is simplified for clarity in exposition and typical networking equipment such as firewalls, routers, and the like are not shown.

The on-premises network and VNet are typically operatively coupled using instances of gateways 130, or other networking devices, over a communication network 135 which may include, for example, private and/or public networking infrastructure using various combinations of connectivity services. The VNet may include multiple subnets 140 that each include one or more instances of virtual machines 145 that are typically connected using load balancers 150 and/or other networking devices. Security and other networking policies (collectively indicated by reference numeral 155) are typically applicable to each subnet. The networking policies are typically different for each subnet, but they can be the same and/or overlap in some cases.

Figure 2:
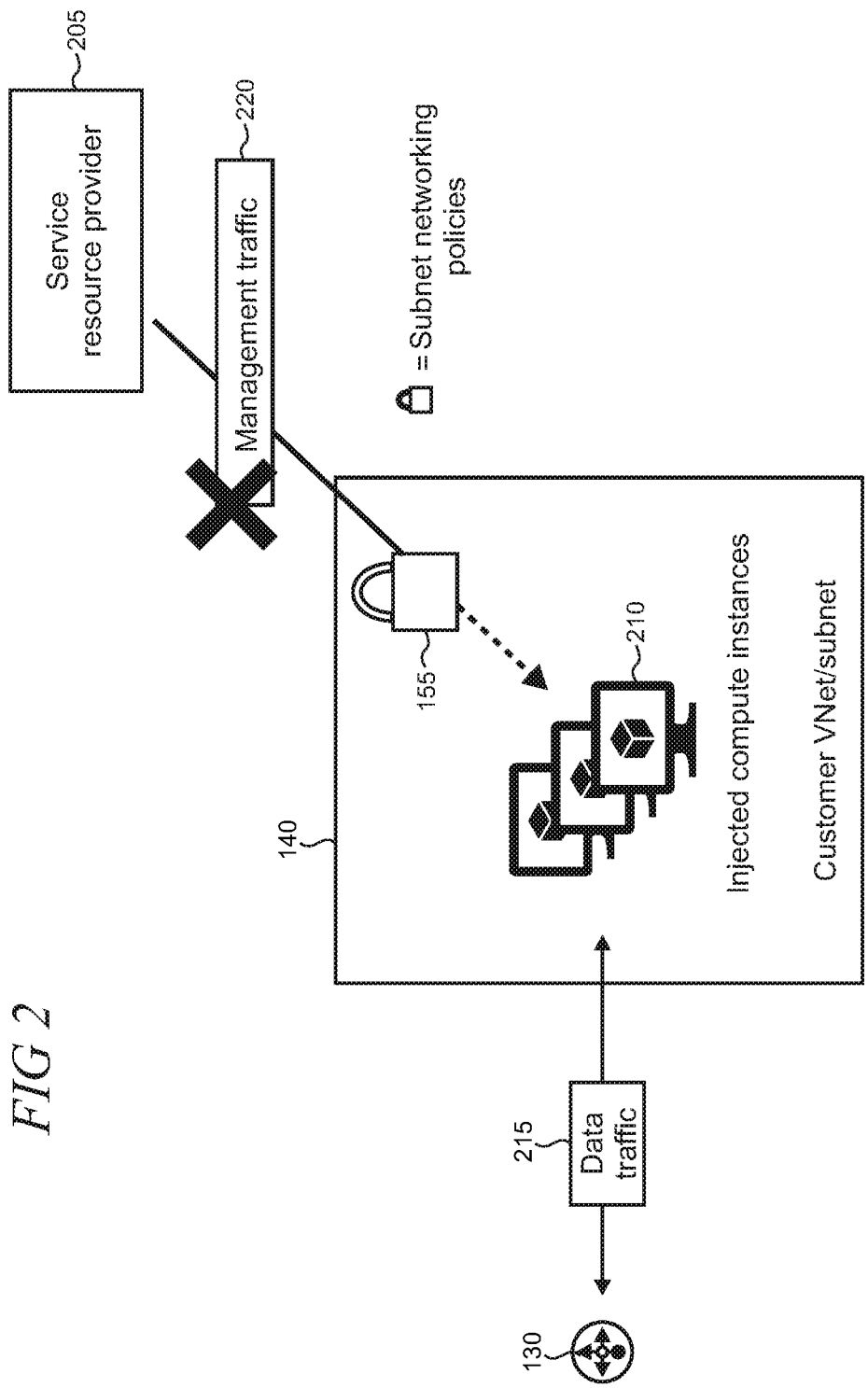
FIG. 2 shows an illustrative service from a service resource provider that injects dedicated compute instances into a customer's virtual network (VNet) in which management traffic is disrupted by a customer's security policies.

FIG. 2 shows an illustrative service from a service resource provider 205 that injects dedicated compute instances 210 into the customer's VNet 115. For example, in implementations supported by Microsoft Corporation, such service resource provider may be implemented using Platform as a Service (PaaS) to provide search, content delivery, etc. The service resource provider may be associated with the cloud service provider 125 (FIG. 1) or be a third party in some cases. Service resource providers may inject compute instances or other resources into a VNet when provisioning a given cloud computing service that interacts with customer data traffic 215 that enters and exits from the gateway 130. As shown in FIG. 2, security or networking policies 155 implemented by a customer to protect a VNet or subnet are utilized to filter traffic and provide end node control at the VM/VNet/subnet for all network traffic flows.

The networking policies will block management traffic 220 by preventing management plane access from the NRP 205 which causes service disruptions. The service disruption may be advantageously addressed by a flexibly extensible network interface controller (eNIC) that is attachable and detachable from a parent network interface controller (NIC) in an elastic manner as discussed below. The separation of management and data planes is generally considered a defining characteristic of software-defined Networking (SDN). Thus, the customer's network 105 (FIG. 1) may be based in whole or part on SDN technologies, in some implementations, as described below.

Figure 3:
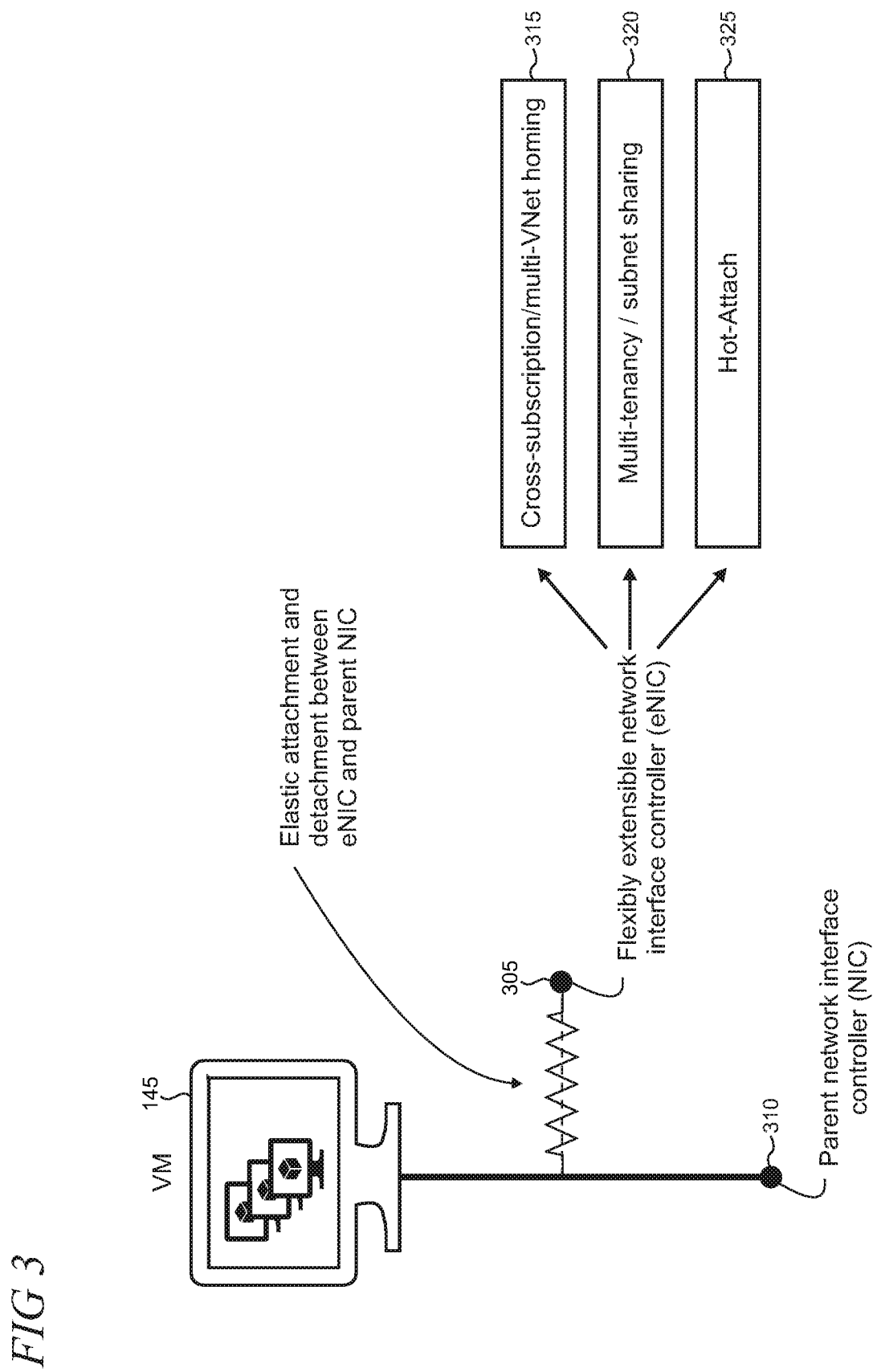
FIG. 3 shows an illustrative flexibly extensible network interface (eNIC) that may be utilized to support a variety of use scenarios.

FIG. 3 shows an illustrative eNIC 305 that may be utilized to support a variety of use scenarios that is attached to a parent NIC 310. The parent NIC is implemented in this example as virtualization of a network interface at the host supporting the VM 145 using a container model, although physical embodiments may be utilized in some scenarios. An eNIC is implemented using a compartment of the container as a child network interface configuration. Essentially, a compute instance is created with a placeholder network interface such that multiple eNICs can be dynamically put up and taken down by respectively being attached and detached from the instance.

The parent NICs and eNICs provide identity, connectivity, and discoverability for the VMs in the customer's VNet. An eNIC enables flexibility for various VM deployment scenarios by its capabilities for attachment and detachment from the parent NIC. The flexibility enables rapid provisioning of a variety of cloud-computing features and services on an on-demand basis without needing to alter the fundamental workflow in a given VM/VNet/subnet while conforming with all applicable networking policies.

As shown in FIG. 3, the use scenarios illustratively include cross-subscriptions and multi-VNet homing (indicated by reference numeral 315), multi-tenancy and subnet sharing 320, and pre-provisioning of resources or "hot attach" 325. Each use scenario is discussed in detail below.

Figure 4:
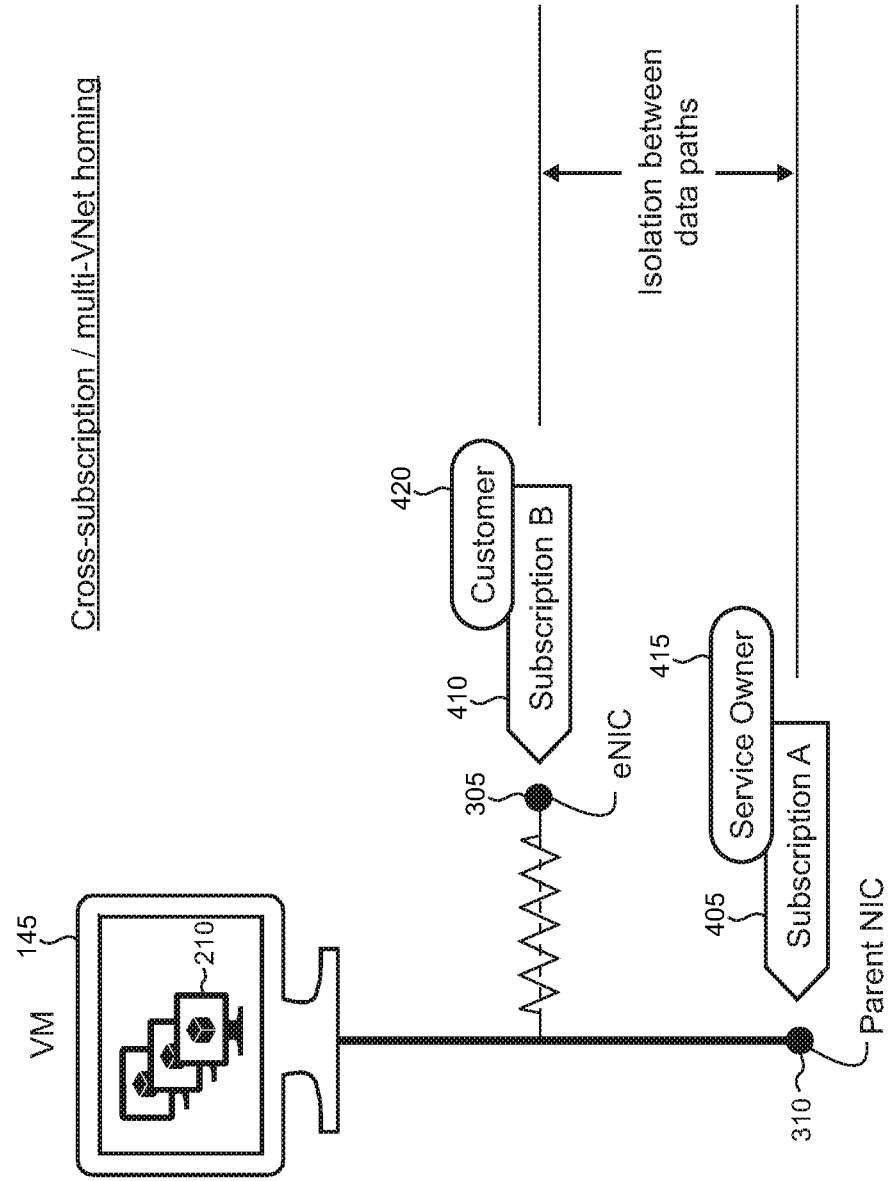
FIG. 4 shows an illustrative eNIC that is attached to a parent NIC to support cross-subscription and multi-VNet homing use scenarios using isolated data paths.

FIG. 4 shows an illustrative eNIC 305 that is attached to a parent NIC 310 to support cross-subscription and multi-VNet homing use scenarios. In this use scenario, the parent NIC and eNICs are respectively associated with different subscriptions—subscription A 405 and subscription B 410. In alternative scenarios, the parent NIC and eNICs can be associated with the same subscription. A subscription is a logical container used to provision resources in a cloud-computing or hybrid network. It holds the details of all resources of an entity (e.g., a customer, service owner, etc.) such as VMs, databases, and the like. When a cloud-computing resource like a VM is created, a subscription to which the resource belongs is identified. As the VM is utilized, the usage of the VM is typically aggregated and billed monthly to the entity.

In the cross-subscription and multi-VNet homing use scenario of FIG. 4, a service owner 415 is associated with subscription A 405 and a customer 420 is associated with subscription B 410. Thus, a single VM 145 is utilized to support access to resources provided therefrom to multiple different VNets—one operated by the customer and one operated by the service owner.

The eNIC 305 provides a solution to the management traffic disruption problem noted above in the description accompanying FIG. 2 by allowing compute instances to be connected using multi-homed networked interfaces using a cross-subscription architecture. The service owner directs management traffic to the compute instances 210 as necessary to implement a given service offering while the customer can direct data traffic to the compute instances as the service is utilized. The management and data planes are operated by the respective parties independently in isolation, as indicated by reference numeral 425, while maintaining conformance with applicable networking policies on an individualized subscription basis.

Figure 5:
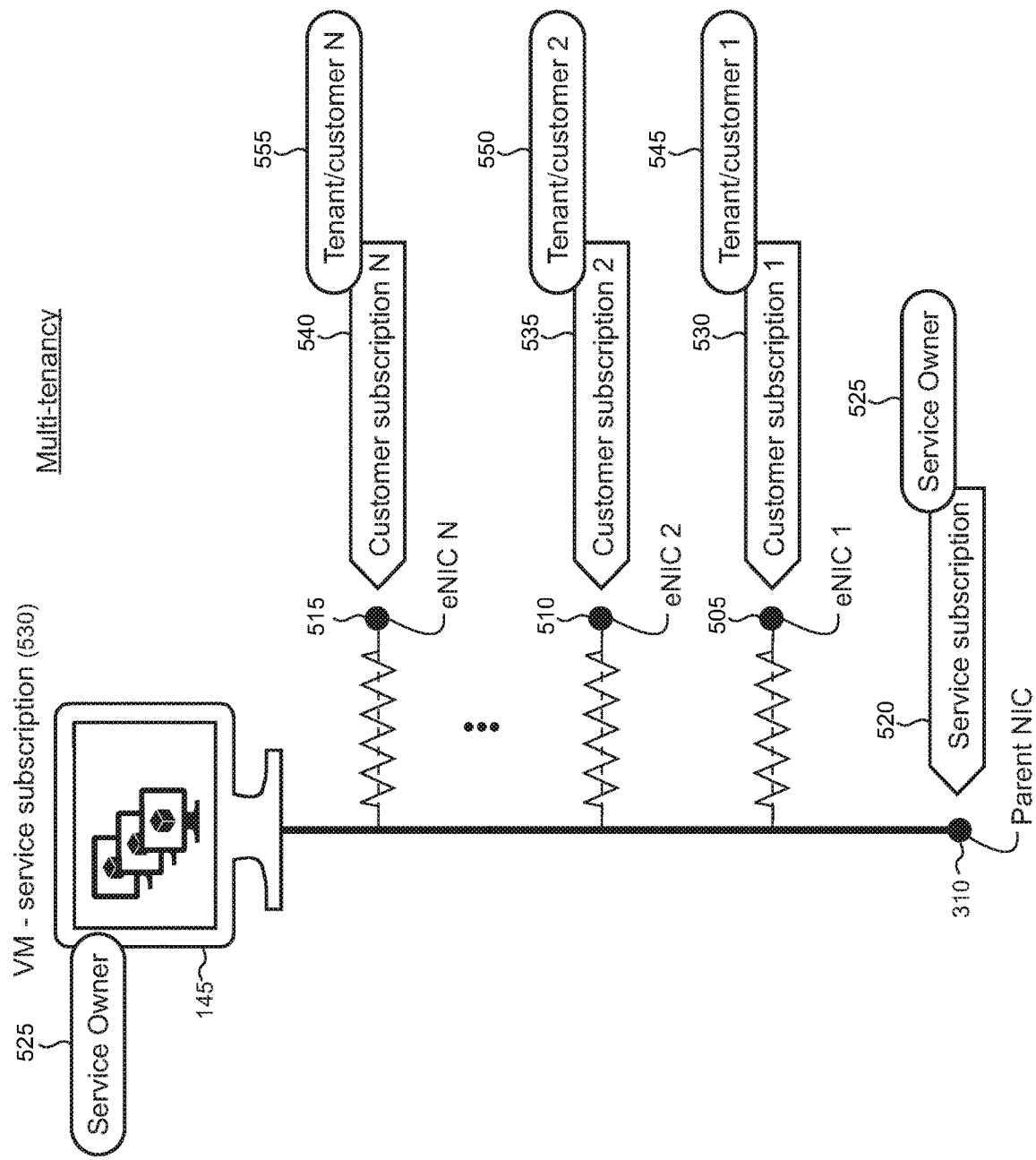
FIG. 5 shows multiple eNICs that are attached to a parent NIC to support a multi-tenancy use scenario.

FIG. 5 shows multiple eNICs 1, 2 . . . N (respectively indicated by reference numerals 505, 510, and 515) that are flexibly attached to a parent NIC 310 to implement a multi-tenancy architecture and accompanying use scenario. The parent NIC is associated with a service subscription 520 of service owner 525 who provides multi-tenant access service to a VM 145. The eNICs are respectively associated with multiple different customer subscriptions 1, 2 . . . N (respectively indicated by reference numerals 530, 535, and 540), and respective tenants or customers 1, 2 . . . N (respectively indicated by reference numerals 545, 550, and 555). As discussed above, the cross-subscription model implemented by the eNIC in this illustrative scenario provides isolation between different computing workloads on the VM while meeting applicable networking policies on an individualized subscription basis.

A multi-tenant architecture can beneficially support cloud-computing models in which a given VM can be shared among multiple tenants by maximizing utilization of the service owner's investments. In addition, by sharing economies of scale across multiple tenants, performance improvements and optimization can often be readily implemented, and maintenance costs shared over a larger base. New tenant onboarding in a multi-tenant architecture may also be simplified in some cases.

Figure 6:
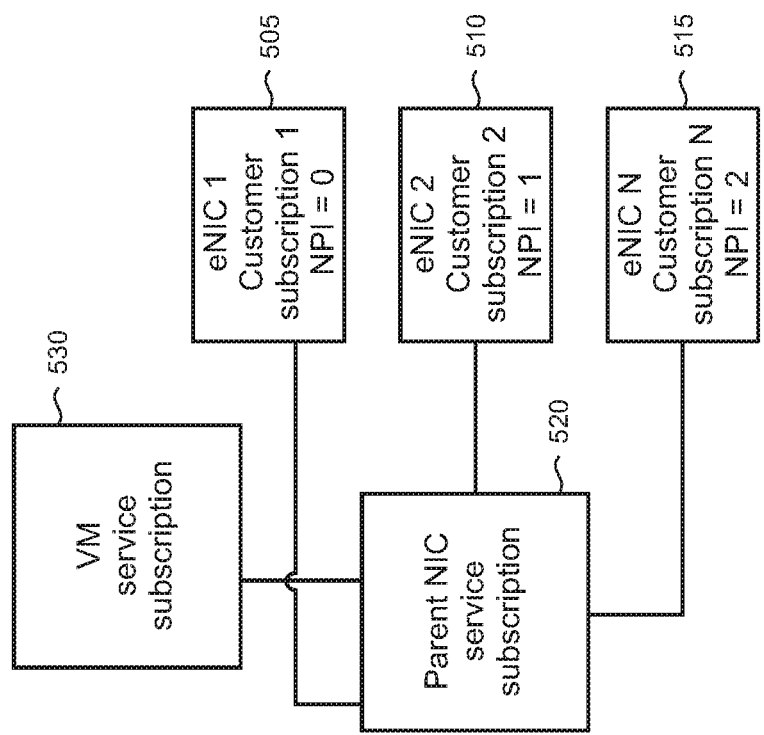
FIG. 6 shows an illustrative allocation of network partition IDs (NPI) to eNICs in multi-tenancy applications.

The multi-tenant architecture may be implemented using a network partition ID (NPI). FIG. 6 shows an illustrative allocation of NPIs to the eNICs in the illustrative multi-tenancy scenario shown in FIG. 5 and described above. Here, the primary eNIC (element 505 in FIG. 5) is given NPI=0 and the additional NPI values follow in sequence for successive eNICs (to a maximum of 4,000 in an illustrative implementation). Applications in the customer's VNet may address packets of data traffic using the NPI of an appropriate eNIC.

Figure 7:
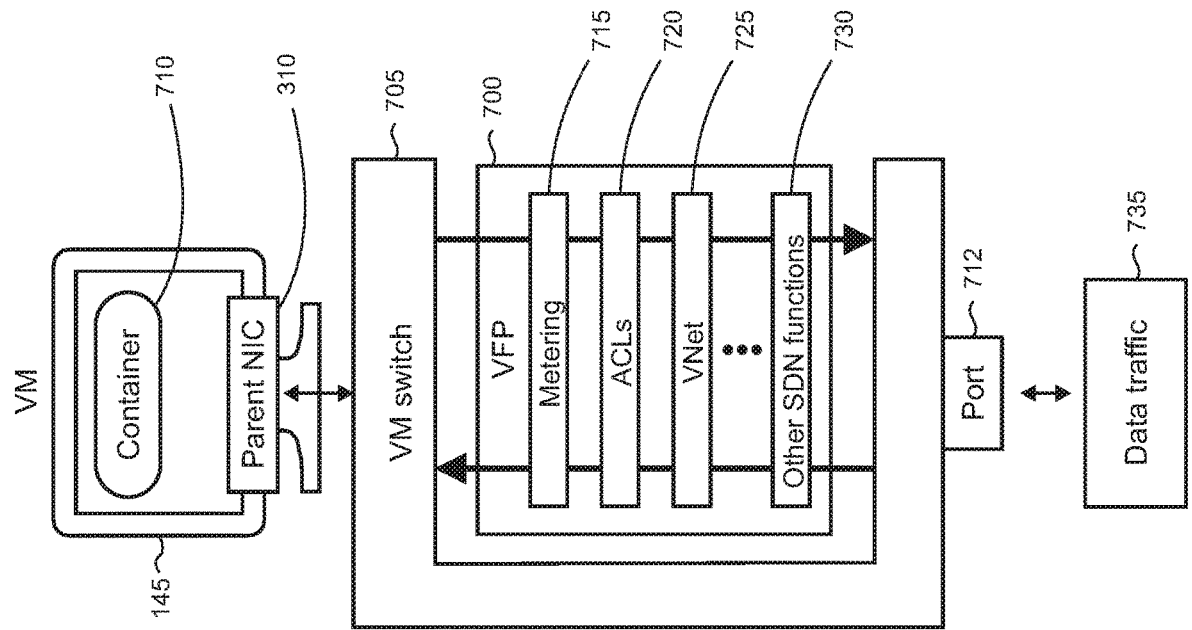
FIG. 7 shows an illustrative virtual filtering platform extension to a virtual machine (VM) switch that enables data paths to be isolated in a multi-tenant architecture.

FIG. 7 shows an illustrative virtual filtering platform (VFP) 700 extension to a VM switch 705 that enables data path isolation in the multi-tenant architecture discussed above by enforcing specific networking policies that are tied to each container 710 that is used to implement a parent NIC to which an eNIC is attached based on the NPI. The VM switch logically underlies the parent NIC 310 and provides a port 712 to each VM supported by the NIC. The VFP divides networking policy applicable to the port into layers that include rules that govern SDN behaviors and characteristics. The virtual filtering platform provides capabilities to enforce policies and transform or tunnel data packets in a given computing workload that are entering and leaving the VM 145. The virtual filtering platform includes a central data packet processor (not shown) that performs the processing of data packets.

The networking policy layers include those, in this example, relating to metering 715, access control lists (ACLs) 720, VNet addressing/routing 725, and other various SDN functions or features 730 which may include, for example, those pertaining to routing, tunneling, filtering, address translation, encryption, decryption, encapsulation, de-encapsulation, or quality of service (QoS). The packet processor in the VFP 700 evaluates the packets of data traffic 735 as they traverse the networking policy layers one by one, matching rules in each layer based on a state of the packet after an action is performed in the preceding layer. Returning packets traverse the layers in the opposite direction and are processed by the VFP to match the applicable rules. The rules used to express the networking policies may be entities that perform actions on matching packets (e.g., using a match action table model) as the computing workload is processed by the VFP.

Figure 8:
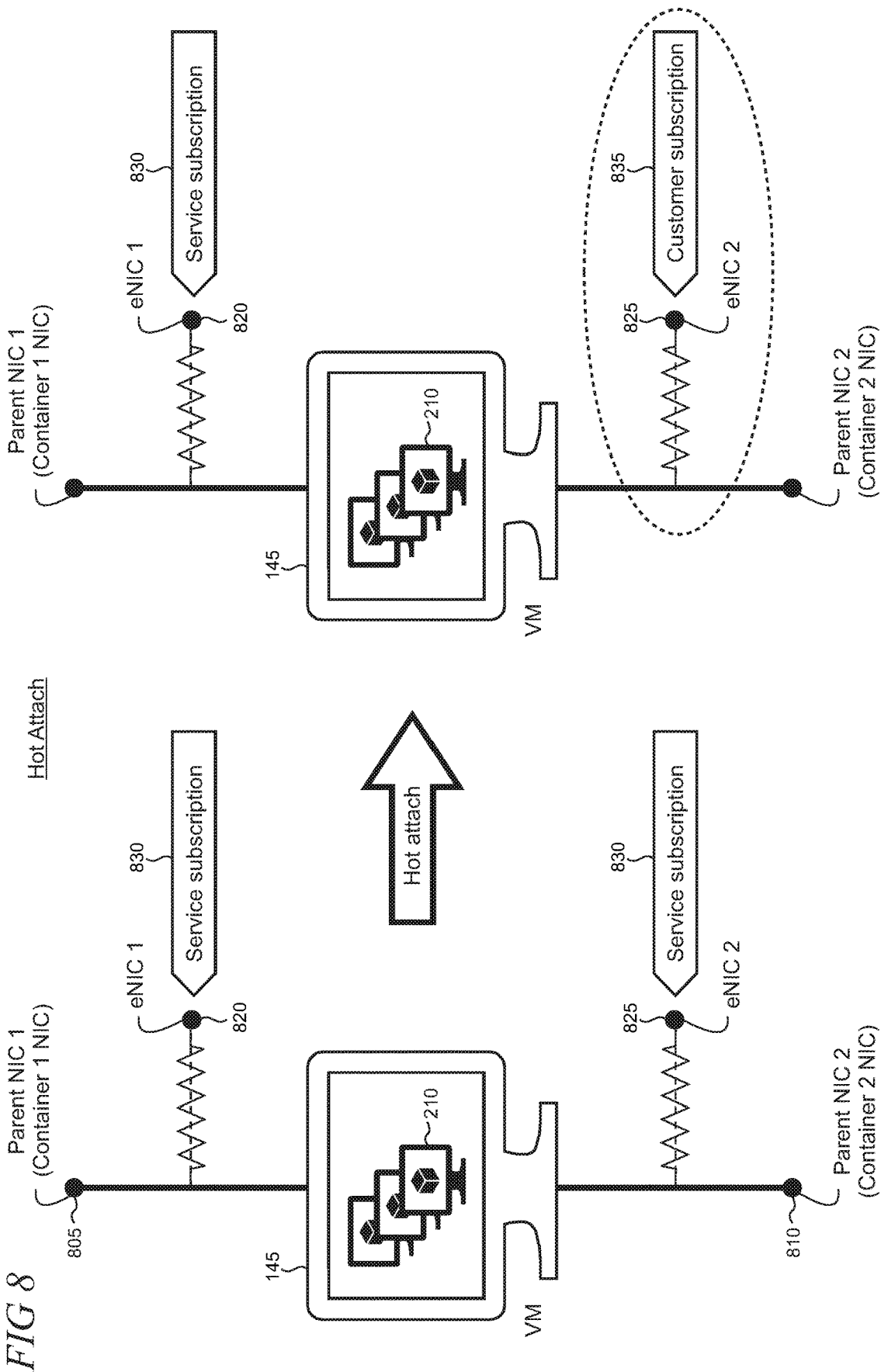
FIG. 8 shows an illustrative use of eNICs in a hot attach use scenario in which active compute instances are connected to a customer's network on-demand.

FIG. 8 shows an illustrative use of eNICs in a hot attach use scenario in which active compute instances are connected to a customer's network on demand. The hot attachment of active compute instances can reduce the time needed to instantiate additional resources using conventional methods. As shown on the left side of FIG. 8, the VM 145 exposes two virtual parent NICs 1 and 2 which are respectively indicated by reference numerals 805 and 810. An eNIC 1 (820) is attached to parent NIC 1 and an eNIC 2 (825) is attached to parent NIC 2. Both eNICs 1 and 2 are associated with a service subscription 830 of the service owner.

When the customer requests an injection of additional compute instances, a hot attachment occurs whereby the eNIC 2 (825) is redeployed to the customer's VNet using the customer's subscription 835, as shown in the dashed oval on the right side of FIG. 8. That is, the customer and service subscriptions are swapped on the eNIC 2 (825) to spool up the additional compute instances for the customer. The eNIC 2 (825) supports data plane traffic to the VM 145 while management plane traffic to the compute instances remains isolated to thereby avoid the disruption that would otherwise occur through normal operations of the customer's security and networking policies.

Figure 9:
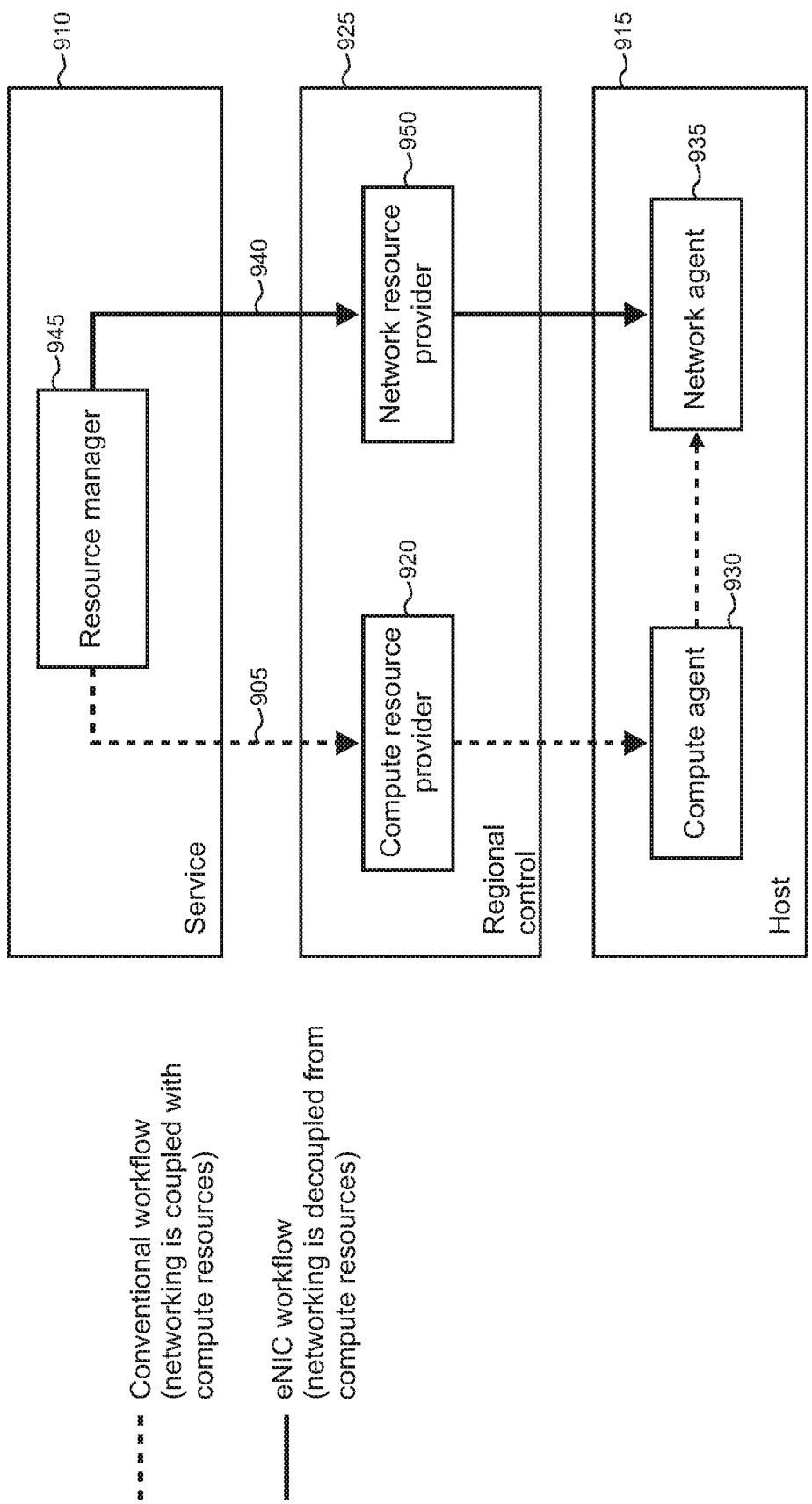
FIG. 9 is an illustrative layered cloud-computing architecture that shows how an eNIC enables a networking functionality to be decoupled with the provisioning of compute resources.

FIG. 9 is an illustrative layered cloud-computing architecture 900 that shows how the present eNIC enables a networking functionality to be decoupled from the provisioning of compute resources. As shown in the conventional workflow, indicated by the dashed line 905, networking between the service layer 910 and host layer 915 is typically coupled with the provisioning of compute resources from a compute resource provider 920. The compute resource provider is instantiated, in this illustrative example, in a regional control layer 925 that may be utilized in some cloud-computing scenarios involving multiple virtual networks. The compute resource provider interfaces with a compute agent 930 in the host layer which, in turn, interfaces with a network agent 935 to complete the workflow.

By comparison with the conventional workflow 905, the workflow enabled by the present eNIC, as indicated by the solid line 940 in FIG. 9, enables the service layer 910 to implement a networking functionality for management and other traffic that is independent from the compute resources. As discussed above, such independence advantageously enables multi-VNet homing, cross-subscription, and hot attach scenarios to be implemented by flexibly attaching an eNIC to a parent NIC. Here, the resource manager 945 may interact with a network resource provider 950 to set up an eNIC that operates with the network agent 935 in the host layer 915 to thereby implement the compute resource-independent network functionality.

Figure 10:
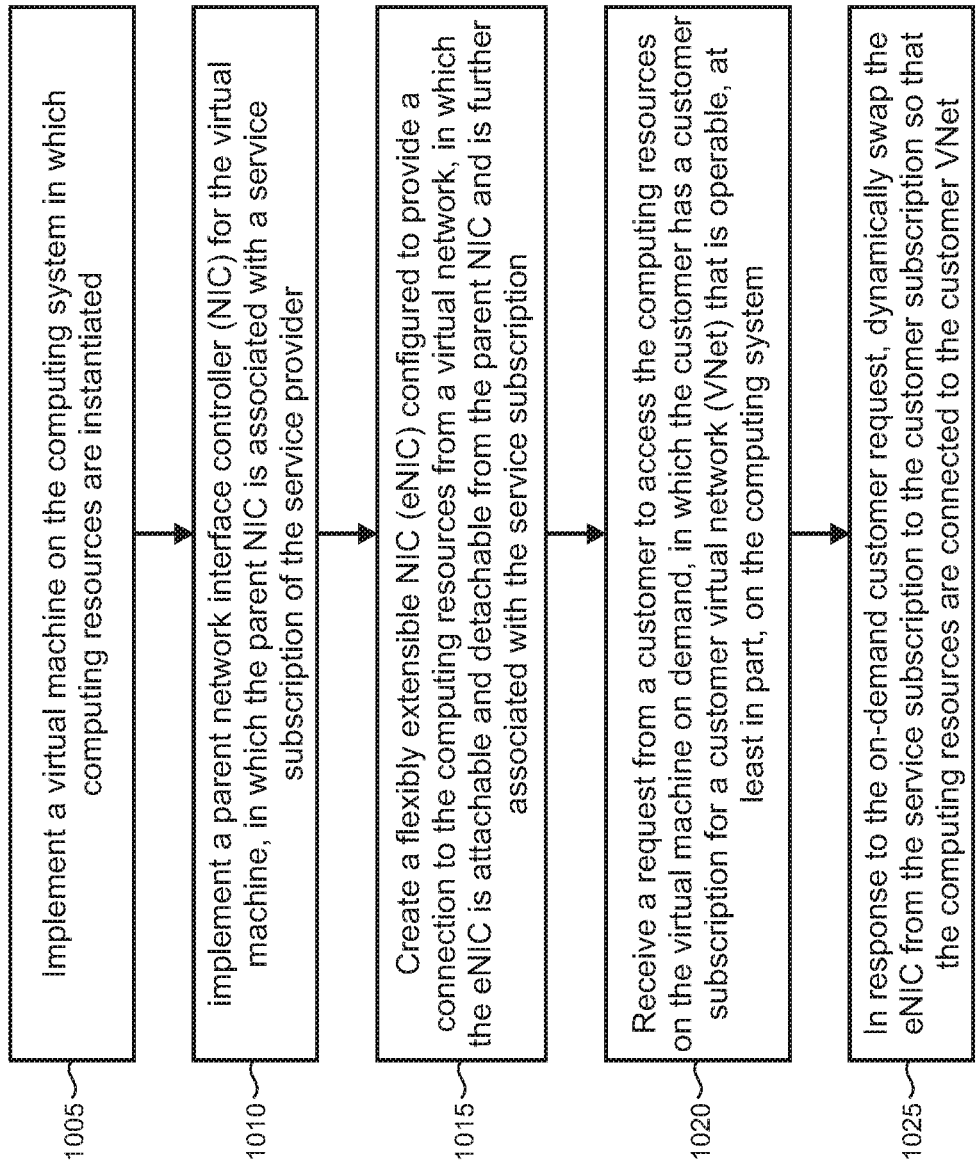
FIGS. 10, 11, and 12 show illustrative methods that may be performed when implementing the present cross-subscription multi-VNet homing.

FIG. 10 is a flowchart of an illustrative method 1000 that may be performed by a computing system when implementing the present cross-subscription multi-VNet homing. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1005, a virtual machine is implemented on the computing system in which computing resources are instantiated. In step 1010, a parent NIC is implemented for the virtual machine, in which the parent NIC is associated with a service subscription of the service provider. In step 1015, an eNIC is configured to provide a connection to the computing resources from a virtual network is created, in which the eNIC is attachable and detachable from the parent NIC and is further associated with the service subscription.

In step 1020, a request is received from a customer to access the computing resources on the virtual machine on demand, in which the customer has a customer subscription for a customer VNet that is operable, at least in part, on the computing system. In step 1025, in response to the on-demand customer request, the eNIC is dynamically swapped from the service subscription to the customer subscription so that the computing resources are connected to the customer VNet.

Figure 11:
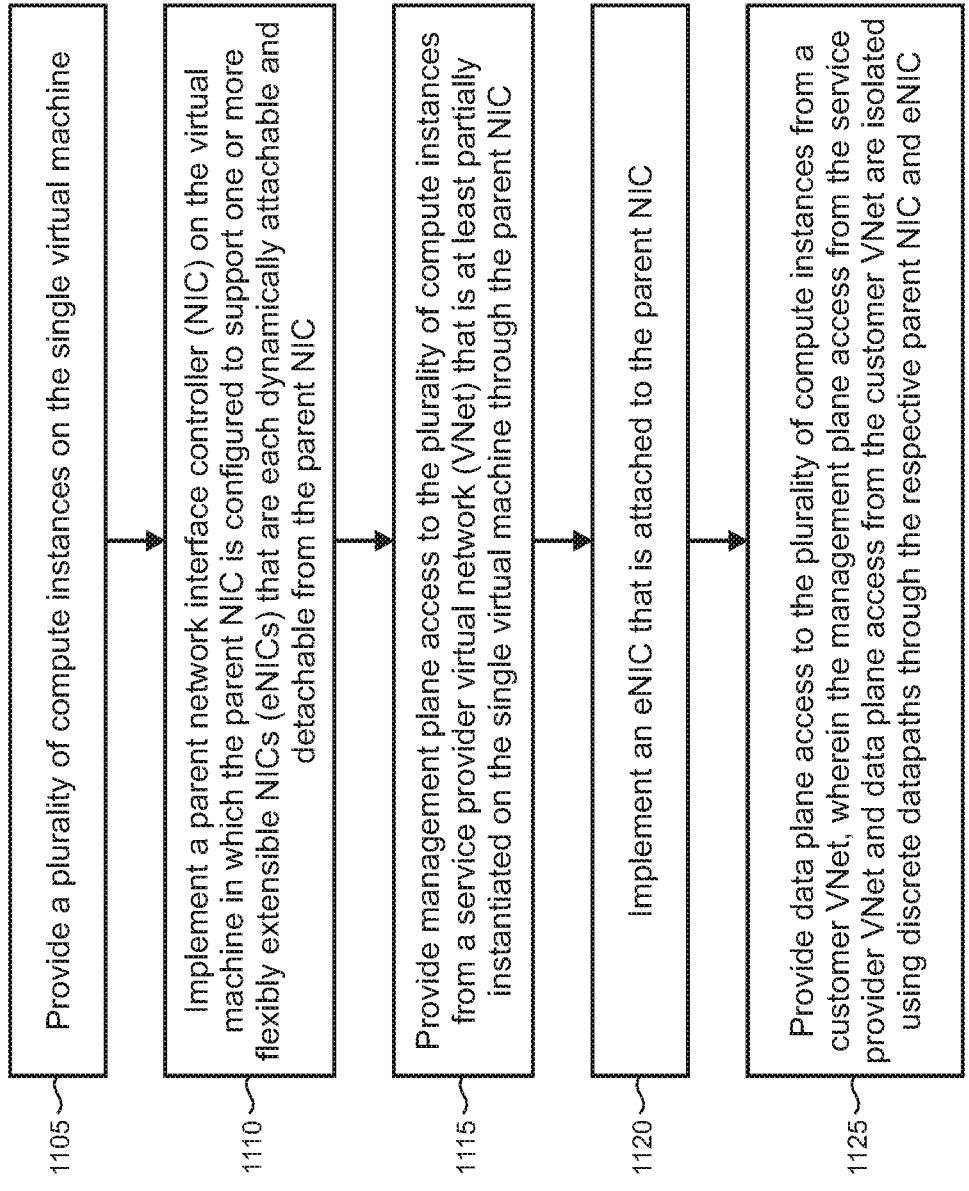

FIG. 11 is a flowchart of an illustrative method 1100 that may be performed by a computing system when implementing the present cross-subscription multi-VNet homing. In step 1105, a plurality of compute instances is provided on the single virtual machine. In step 1110, a parent NIC is implemented on the virtual machine in which the parent NIC is configured to support one or more eNICs that are each dynamically attachable and detachable from the parent NIC. In step 1115, management plane access is provided to the plurality of compute instances from a service provider VNet that is at least partially instantiated on the single virtual machine through the parent NIC.

In step 1120, an eNIC is implemented that is attached to the parent NIC. In step 1125, data plane access is provided to the plurality of the compute instances from a customer VNet, wherein the management plane access from the service provider VNet and data plane access from the customer VNet are isolated using discrete datapaths through the respective parent NIC and eNIC.

Figure 12:
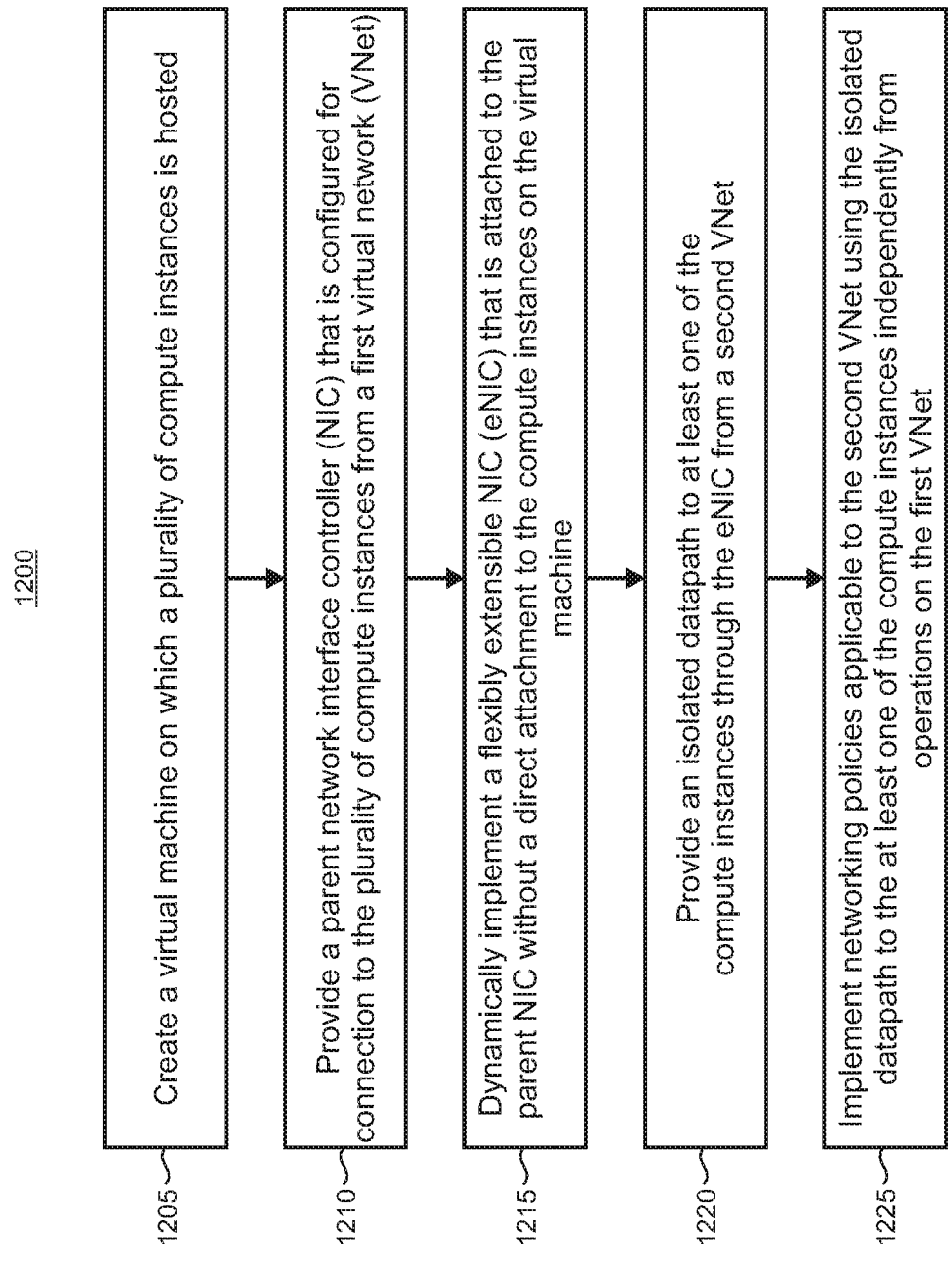

FIG. 12 is a flowchart of an illustrative method 1200 that may be performed by a computing system when implementing the present cross-subscription multi-VNet homing. In step 1205, a virtual machine is created on which a plurality of compute instances is hosted. In step 1210, a parent NIC is provided that is configured for connection to the plurality of compute instances from a first VNet. In step 1215, an eNIC is dynamically created that is attached to the parent NIC without a direct attachment to the compute instances on the virtual machine.

In step 1220, an isolated datapath is provided to at least one of the compute instances through the eNIC from a second VNet. In step 1225, networking policies applicable to the second VNet are implemented using the isolated datapath to the at least one of the compute instances independently from operations on the first VNet.

Figure 13:
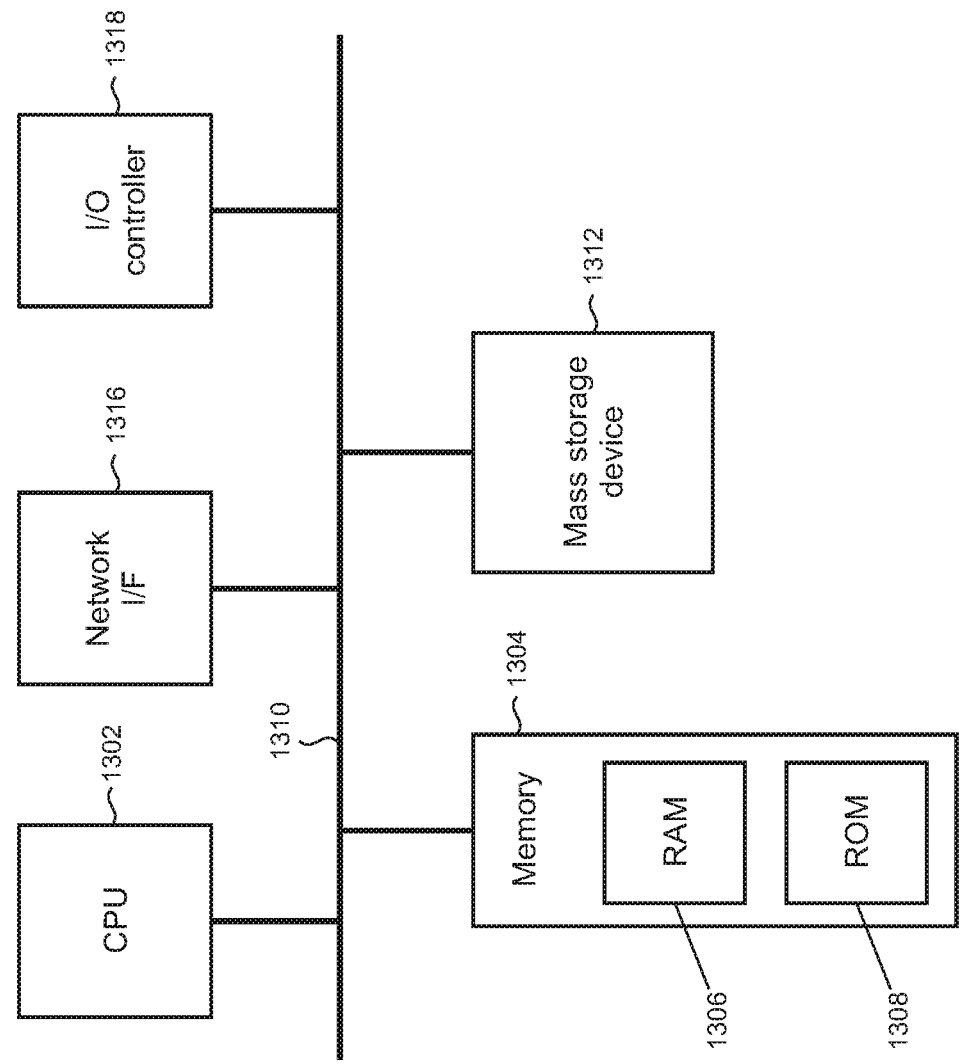
FIG. 13 is a block diagram of an illustrative server that may be used at least in part to implement the present cross-subscription multi-VNet homing.

FIG. 13 shows an illustrative architecture 1300 for a device, such as a server, capable of executing the various components described herein for cross-subscription multi-VNet homing. The architecture 1300 illustrated in FIG. 13 includes one or more processors 1302 (e.g., central processing unit, dedicated AI chip, graphics processing unit, etc.), a system memory 1304, including RAM (random access memory) 1306 and ROM (read only memory) 1308, and a system bus 1310 that operatively and functionally couples the components in the architecture 1300. A basic input/output system containing the basic routines that help to transfer information between elements within the architecture 1300, such as during startup, is typically stored in the ROM 1308. The architecture 1300 further includes a mass storage device 1312 for storing software code or other computer-executed code that is utilized to implement applications, the file system, and the operating system. The mass storage device 1312 is connected to the processor 1302 through a mass storage controller (not shown) connected to the bus 1310. The mass storage device 1312 and its associated computer-readable storage media provide non-volatile storage for the architecture 1300. Although the description of computer-readable storage media contained herein refers to a mass storage device, such as a hard disk or CD-ROM drive, it may be appreciated by those skilled in the art that computer-readable storage media can be any available storage media that can be accessed by the architecture 1300.

By way of example, and not limitation, computer-readable storage media may include volatile and non-volatile, removable, and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1300.

According to various embodiments, the architecture 1300 may operate in a networked environment using logical connections to remote computers through a network. The architecture 1300 may connect to the network through a network interface unit 1316 connected to the bus 1310. It may be appreciated that the network interface unit 1316 also may be utilized to connect to other types of networks and remote computer systems. The architecture 1300 also may include an input/output controller 1318 for receiving and processing input from a number of other devices, including a keyboard, mouse, touchpad, touchscreen, control devices such as buttons and switches or electronic stylus (not shown in FIG. 13). Similarly, the input/output controller 1318 may provide output to a display screen, user interface, a printer, or other type of output device (also not shown in FIG. 13).

It may be appreciated that the software components described herein may, when loaded into the processor 1302 and executed, transform the processor 1302 and the overall architecture 1300 from a general-purpose computing system into a special-purpose computing system customized to facilitate the functionality presented herein. The processor 1302 may be constructed from any number of transistors or other discrete circuit elements, which may individually or collectively assume any number of states. More specifically, the processor 1302 may operate as a finite-state machine, in response to executable instructions contained within the software modules disclosed herein. These computer-executable instructions may transform the processor 1302 by specifying how the processor 1302 transitions between states, thereby transforming the transistors or other discrete hardware elements constituting the processor 1302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1300 in order to store and execute the software components presented herein. It also may be appreciated that the architecture 1300 may include other types of computing devices, including wearable devices, handheld computers, embedded computer systems, smartphones, PDAs, and other types of computing devices known to those skilled in the art. It is also contemplated that the architecture 1300 may not include all of the components shown in FIG. 13, may include other components that are not explicitly shown in FIG. 13, or may utilize an architecture completely different from that shown in FIG. 13.

Figure 14:
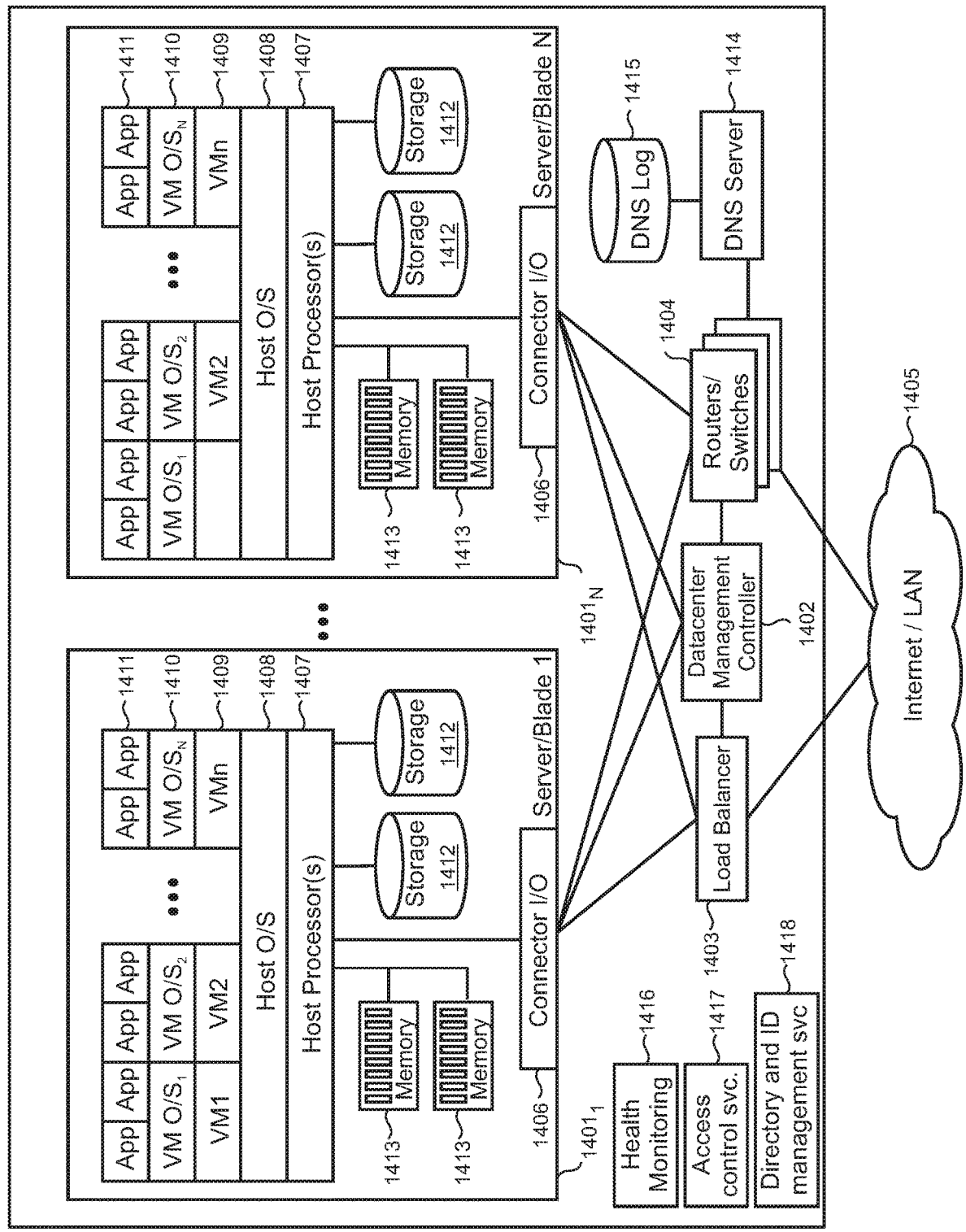
FIG. 14 is a block diagram of an illustrative datacenter that may be used at least in part to implement the present cross-subscription multi-VNet homing.

FIG. 14 is a high-level block diagram of an illustrative datacenter 1400 that provides cloud computing services or distributed computing services that may be used to implement the present cross-subscription multi-VNet homing. Datacenter 1400 may incorporate at least some of the features disclosed herein. A plurality of servers 1401 are managed by datacenter management controller 1402. Load balancer 1403 distributes requests and computing workloads over servers 1401 to avoid a situation wherein a single server may become overwhelmed. Load balancer 1403 maximizes available capacity and performance of the resources in datacenter 1400. Routers/switches 1404 support data traffic between servers 1401 and between datacenter 1400 and external resources and users (not shown) via an external network 1405, which may be, for example, a local area network (LAN) or the Internet.

Servers 1401 may be standalone computing devices, and/or they may be configured as individual blades in a rack of one or more server devices. Servers 1401 have an input/output (I/O) connector 1406 that manages communication with other database entities. One or more host processors 1407 on each server 1401 run a host operating system (O/S) 1408 that supports multiple virtual machines (VM) 1409. Each VM 1409 may run its own O/S so that each VM O/S 1410 on a server is different, or the same, or a mix of both. The VM O/Ss 1410 may be, for example, different versions of the same O/S (e.g., different VMs running different current and legacy versions of the Windows® operating system). In addition, or alternatively, the VM O/Ss 1410 may be provided by different manufacturers (e.g., some VMs running the Windows® operating system, while other VMs are running the Linux® operating system). Each VM 1409 may also run one or more applications (App) 1411. Each server 1401 also includes storage 1412 (e.g., hard disk drives (HDD)) and memory 1413 (e.g., RAM) that can be accessed and used by the host processors 1407 and VMs 1409 for storing software code, data, etc. In one embodiment, a VM 1409 may employ the data plane APIs as disclosed herein.

Datacenter 1400 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1400 allows tenants to scale up or scale down resources dynamically to meet the current needs of their business. Additionally, a datacenter operator can provide usage-based services to tenants so that they pay for only the resources they use when they need to use them. For example, a tenant may initially use one VM 1409 on server $1401_1$ to run their applications 1411. When demand for an application 1411 increases, the datacenter 1400 may activate additional VMs 1409 on the same server $1401_1$ and/or on a new server $1401_N$ as needed. These additional VMs 1409 can be deactivated if demand for the application later drops.

Datacenter 1400 may offer guaranteed availability, disaster recovery, and back-up services. For example, the datacenter may designate one VM 1409 on server $1401_1$ as the primary location for the tenant's application and may activate a second VM 1409 on the same or a different server as a standby or back-up in case the first VM or server $1401_1$ fails. Datacenter management controller 1402 automatically shifts incoming user requests from the primary VM to the back-up VM without requiring tenant intervention. Although datacenter 1400 is illustrated as a single location, it will be understood that servers 1401 may be distributed to multiple locations across the globe to provide additional redundancy and disaster recovery capabilities. Additionally, datacenter 1400 may be an on-premises, private system that provides services to a single enterprise user or may be a publicly accessible, distributed system that provides services to multiple, unrelated customers and tenants or may be a combination of both.

Domain Name System (DNS) server 1414 resolves domain and host names into IP addresses for all roles, applications, and services in datacenter 1400. DNS log 1415 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 1416 monitors the health of the physical systems, software, and environment in datacenter 1400. Health monitoring 1416 provides feedback to datacenter managers when problems are detected with servers, blades, processors, or applications in datacenter 1400 or when network bandwidth or communications issues arise.

Access control service 1417 determines whether users are allowed to access particular connections and services provided by the datacenter 1400. Directory and identity management service 1418 authenticates user credentials for tenants on datacenter 1400.

Figure 15:
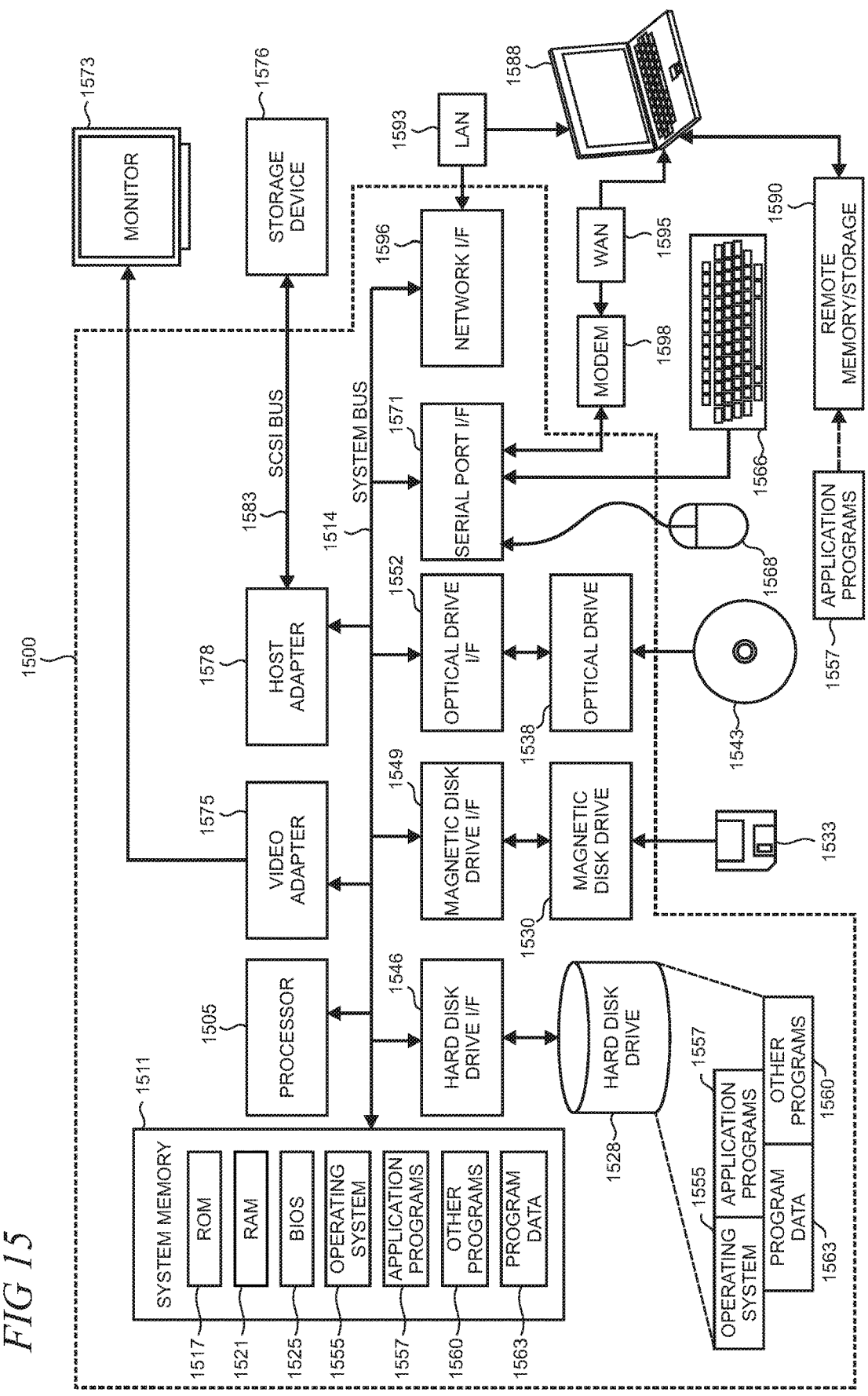
FIG. 15 is a simplified block diagram of an illustrative computer system that may be used at least in part to implement the present cross-subscription multi-VNet homing.

FIG. 15 is a simplified block diagram of an illustrative computer system 1500 such as a PC, client machine, or server with which the present cross-subscription multi-VNet homing may be implemented. Computer system 1500 includes a processor 1505, a system memory 1511, and a system bus 1514 that couples various system components including the system memory 1511 to the processor 1505. The system bus 1514 may be any of several types of bus structures including a memory bus or memory controller, a peripheral bus, or a local bus using any of a variety of bus architectures. The system memory 1511 includes read only memory (ROM) 1517 and random-access memory (RAM) 1521. A basic input/output system (BIOS) 1525, containing the basic routines that help to transfer information between elements within the computer system 1500, such as during startup, is stored in ROM 1517. The computer system 1500 may further include a hard disk drive 1528 for reading from and writing to an internally disposed hard disk (not shown), a magnetic disk drive 1530 for reading from or writing to a removable magnetic disk 1533 (e.g., a floppy disk), and an optical disk drive 1538 for reading from or writing to a removable optical disk 1543 such as a CD (compact disc), DVD (digital versatile disc), or other optical media. The hard disk drive 1528, magnetic disk drive 1530, and optical disk drive 1538 are connected to the system bus 1514 by a hard disk drive interface 1546, a magnetic disk drive interface 1549, and an optical drive interface 1552, respectively. The drives and their associated computer-readable storage media provide non-volatile storage of computer-readable instructions, data structures, program modules, and other data for the computer system 1500. Although this illustrative example includes a hard disk, a removable magnetic disk 1533, and a removable optical disk 1543, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present cross-subscription multi-VNet homing. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1533, optical disk 1543, ROM 1517, or RAM 1521, including an operating system 1555, one or more application programs 1557, other program modules 1560, and program data 1563. A user may enter commands and information into the computer system 1500 through input devices such as a keyboard 1566 and pointing device 1568 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1505 through a serial port interface 1571 that is coupled to the system bus 1514, but may be connected by other interfaces, such as a parallel port, game port, or universal serial bus (USB). A monitor 1573 or other type of display device is also connected to the system bus 1514 via an interface, such as a video adapter 1575. In addition to the monitor 1573, personal computers typically include other peripheral output devices (not shown), such as speakers and printers. The illustrative example shown in FIG. 15 also includes a host adapter 1578, a Small Computer System Interface (SCSI) bus 1583, and an external storage device 1576 connected to the SCSI bus 1583.

The computer system 1500 is operable in a networked environment using logical connections to one or more remote computers, such as a remote computer 1588. The remote computer 1588 may be selected as another personal computer, a server, a router, a network PC, a peer device, or other common network node, and typically includes many or all of the elements described above relative to the computer system 1500, although only a single representative remote memory/storage device 1590 is shown in FIG. 15. The logical connections depicted in FIG. 15 include a local area network (LAN) 1593 and a wide area network (WAN) 1595. Such networking environments are often deployed, for example, in offices, enterprise-wide computer networks, intranets, and the Internet.

When used in a LAN networking environment, the computer system 1500 is connected to the local area network 1593 through a network interface or adapter 1596. When used in a WAN networking environment, the computer system 1500 typically includes a broadband modem 1598, network gateway, or other means for establishing communications over the wide area network 1595, such as the Internet. The broadband modem 1598, which may be internal or external, is connected to the system bus 1514 via a serial port interface 1571. In a networked environment, program modules related to the computer system 1500, or portions thereof, may be stored in the remote memory storage device 1590. It is noted that the network connections shown in FIG. 15 are illustrative and other means of establishing a communications link between the computers may be used depending on the specific requirements of an application of the present cross-subscription multi-VNet homing.

Various exemplary embodiments of the present cross-subscription multi-VNet homing are now presented by way of illustration and not as an exhaustive list of all embodiments. An example includes a computing system operated by a provider of a service, comprising: one or more processors; and at least one hardware-based non-transitory computer-readable memory having computer-executable instructions stored thereon which, when executed by the one or more processors, cause the computing system to implement a virtual machine on the computing system in which computing resources are instantiated, implement a parent network interface controller (NIC) for the virtual machine, in which the parent NIC is associated with a service subscription of the provider, create a flexibly extensible NIC (eNIC) configured to provide a connection to the computing resources from a virtual network, in which the eNIC is attachable and detachable from the parent NIC and is further associated with the service subscription, receive a request from a customer to access the computing resources on the virtual machine on demand, in which the customer has a customer subscription for a customer virtual network (VNet) that is operable, at least in part, on the computing system, and in response to the on-demand customer request, dynamically swap the eNIC from the service subscription to the customer subscription so that the computing resources are connected to the customer VNet.

In another example, data traffic between the computing resources and the customer VNet flows through the eNIC. In another example, the computing resources comprise compute instances. In another example, one or more networking policies are tied to computing resources, in which the networking policies are expressed by one or more rules for one of access control, metering, routing, tunneling, filtering, address translation, encryption, decryption, encapsulation, de-encapsulation, or quality of service. In another example, the parent NIC comprises a created compute instance having at least one placeholder network interface in which the eNIC is dynamically attachable and detachable from the created compute instance. In another example, the parent NIC is a virtual NIC that is implemented using one or more compartments, in which each of the one or more compartments contains a separate instance of an eNIC using a child network interface configuration. In another example, the virtual machine includes a first discrete group of resources that is connected to the customer's VNet through the eNIC, and further includes a second discrete group of resources that is accessed through the parent NIC and is not connected to the customer's VNet. In another example, the dynamic swap enables connectivity to the computing resources from the customer's VNet without restarting the virtual machine.

A further example includes a method for supporting a multi-VNet homing in a cloud computing environment on a single virtual machine, comprising: providing a plurality of compute instances on the single virtual machine; implementing a parent NIC on the virtual machine in which the parent NIC is configured to support one or more eNICs that are each dynamically attachable and detachable from the parent NIC; providing management plane access to the plurality of compute instances from a service VNet that is at least partially instantiated on the single virtual machine through the parent NIC; implementing an eNIC that is attached to the parent NIC; and providing data plane access to the plurality of compute instances from a customer VNet, wherein the management plane access from the service provider VNet and data plane access from the customer VNet are isolated using discrete datapaths through the respective parent NIC and eNIC.

In another example, networking policy is implemented for the compute instances without disruption to traffic on the management plane. In another example, the method further includes implementing a plurality of discrete eNICs in which a unique network partition identifier (NPI) is assigned to respective eNICs among the plurality and in which datapath isolation is provided based on the NPI. In another example, different discrete eNICs are respectively associated with different customer subscriptions. In another example, the service provider injects one or more compute instances into the customer VNet to implement a cloud-computing service. In another example, the compute instances are injected into different customer subnets on the virtual machine. In another example, different discrete eNICs are respectively associated with the different customer subnets.

A further example includes one or more hardware-based non-transitory computer-readable memory devices storing computer-executable instructions which, upon execution by one or more processors in a computer server, cause the computer server to: create a virtual machine on which a plurality of compute instances is provided; provide a parent NIC that is configured for connection to the plurality of compute instances from a first VNet; dynamically implement an eNIC that is attached to the parent NIC without a direct attachment to the compute instances on the virtual machine; provide an isolated datapath to at least one of the compute instances through the eNIC from a second VNet; and implement networking policies applicable to the second VNet using the isolated datapath to the at least one of compute instances independently from operations on the first VNet.

In another example, the eNIC is compute-independent, and a goal state for the eNIC is controlled by software-defined networking operations that execute, at least in part, on the computer server. In another example, the parent NIC and the eNIC are associated with a common subscription. In another example, the parent NIC and the eNIC are associated with different subscriptions. In another example, the instructions further cause the computer server to attach multiple eNICs to the parent NIC to associate ones of the compute instances with different tenants to thereby implement a multi-tenant virtual machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing system operated by a service provider, comprising:
   one or more processors; and
   at least one hardware-based non-transitory computer-readable memory having computer-executable instructions stored thereon which, when executed by the one or more processors, cause the computing system to
      implement a virtual machine on the computing system in which computing resources are instantiated, the computing resources provided by a compute resource provider,
      implement a parent network interface controller (NIC) for the virtual machine, in which the parent NIC is associated with a service subscription of the service provider, wherein the parent NIC provides a child network interface providing access to a network resource provider,
      create a flexibly extensible NIC (eNIC) configured to use a network connection set up by the network resource provider to connect and disconnect a virtual network to the computing resources using the child network interface responsive to the eNIC being attached to and detached from the parent NIC and, wherein the eNIC is associated with the service subscription,
      receive a request from a customer to access the computing resources on the virtual machine on demand, in which the customer has a customer subscription for a customer virtual network (VNet) that is operable, at least in part, on the computing system, and
      in response to the on-demand customer request, dynamically swap the eNIC from the service subscription to the customer subscription so that the computing resources are connected to the customer VNet,
      wherein the compute resource provider and network resource provider are decoupled using discrete management plane and data plane datapaths through the respective parent NIC and eNIC.

2. The computing system of claim 1 in which data traffic between the computing resources and the customer VNet flows through the eNIC.

3. The computing system of claim 2 in which the computing resources comprise compute instances.

4. The computing system of claim 2 in which one or more networking policies are tied to computing resources, in which the networking policies are expressed by one or more rules for one of access control, metering, routing, tunneling, filtering, address translation, encryption, decryption, encapsulation, de-encapsulation, or quality of service.

5. The computing system of claim 1 in which the parent NIC comprises a created compute instance having at least one placeholder network interface in which the eNIC is dynamically attachable and detachable from the created compute instance.

6. The computing system of claim 1 in which the parent NIC is a virtual NIC that is implemented using one or more compartments, in which each of the one or more compartments contains a separate instance of an eNIC using a child network interface configuration.

7. The computing system of claim 1 in which the virtual machine includes a first discrete group of resources that is connected to the customer's VNet through the eNIC, and further includes a second discrete group of resources that is accessed through the parent NIC and is not connected to the customer's VNet.

8. The computing system of claim 1 in which the dynamic swap enables connectivity to the computing resources from the customer's VNet without restarting the virtual machine.

9. A method for supporting a multi-VNet homing in a cloud computing environment on a single virtual machine, comprising:
   providing a plurality of compute instances on the single virtual machine, the compute instances provided by a compute resource provider;
   implementing a parent network interface controller (NIC) on the virtual machine in which the parent NIC is configured to support one or more flexibly extensible NICs (eNICs) that are each dynamically attachable and detachable from the parent NIC, wherein the parent NIC provides a child network interface providing access to a network resource provider that sets up a network connection between an eNIC and the plurality of compute instances;
   providing management plane access through the parent NIC to the plurality of compute instances from a service provider virtual network (VNet) that is at least partially instantiated on the single virtual machine;
   implementing an eNIC that utilizes the placeholder network interface in response to attachment to the parent NIC; and
   providing data plane access through the eNIC to the plurality of compute instances from a customer VNet, wherein the management plane access from the service provider VNet and data plane access from the customer VNet are isolated using discrete management plane and data plane datapaths through the respective parent NIC and eNIC in which the discrete management plane and data plane datapaths decouple the network resource provider from the compute resource provider.

10. The method of claim 9 in which networking policy is implemented for the compute instances without disruption to traffic on the management plane.

11. The method of claim 9 further including implementing a plurality of discrete eNICs in which a unique network partition identifier (NPI) is assigned to respective eNICs among the plurality and in which datapath isolation is provided based on the NPI.

12. The method of claim 11 in which different discrete eNICs are respectively associated with different customer subscriptions.

13. The method of claim 9 in which the service provider injects one or more compute instances into the customer VNet to implement a cloud-computing service.

14. The method of claim 13 in which the compute instances are injected into different customer subnets on the virtual machine.

15. The method of claim 14 in which different discrete eNICs are respectively associated with the different customer subnets.

16. One or more hardware-based non-transitory computer-readable memory devices storing computer-executable instructions which, upon execution by one or more processors in a computer server, cause the computer server to:
   create a virtual machine on which a plurality of compute instances is provided, the compute instances provided by a compute resource provider;
   provide a parent network interface controller (NIC) that is configured for connection to the plurality of compute instances from a first virtual network (VNet), wherein the parent NIC provides a child network interface providing access to a network resource provider;
   dynamically implement a flexibly extensible NIC (eNIC) configured to use a network connection set up by the network resource provider responsively to attachment to the parent NIC to connect a virtual network to the plurality of compute instances without a direct attachment to the plurality of compute instances on the virtual machine;
   provide an isolated datapath to at least one of the compute instances through the eNIC using the child network interface from a second VNet;
   implement networking policies applicable to the second VNet using the isolated datapath to the at least one of the compute instances independently from operations on the first VNet, and
   decouple the compute resource provider and network resource provider using discrete management plane and data plane datapaths through the respective parent NIC and eNIC.

17. The one or more hardware-based non-transitory computer-readable memory devices of claim 16 in which the eNIC is compute-independent, and a goal state for the eNIC is controlled by software-defined networking operations that execute, at least in part, on the computer server.

18. The one or more hardware-based non-transitory computer-readable memory devices of claim 16 in which the parent NIC and the eNIC are associated with a common subscription.

19. The one or more hardware-based non-transitory computer-readable memory devices of claim 16 in which the parent NIC and the eNIC are associated with different subscriptions.

20. The one or more hardware-based non-transitory computer-readable memory devices of claim 16 in which the instructions further cause the computer server to attach multiple eNICs to the parent NIC to associate ones of the compute instances with different tenants to thereby implement a multi-tenant virtual machine.

* * * * *